US007495792B2

(12) United States Patent
Snowdon et al.

(10) Patent No.: US 7,495,792 B2
(45) Date of Patent: Feb. 24, 2009

(54) PROGRAMMABLE PHYSICAL DOCUMENT

(75) Inventors: Dave Snowdon, Grenoble (FR);
Christer Fernstrom, St-Ismier (FR);
Marc Dymetman, Grenoble (FR);
Natalie S. Glance, Pittsburgh, PA (US)

(73) Assignee: Xerox Corporation, Norwalk, CT (US)

( * ) Notice: Subject to any disclaimer, the term of this patent is extended or adjusted under 35 U.S.C. 154(b) by 1558 days.

(21) Appl. No.: 09/745,927

(22) Filed: Dec. 21, 2000

(65) Prior Publication Data

US 2002/0080386 A1 Jun. 27, 2002

(51) Int. Cl.
*G06F 15/00* (2006.01)
(52) U.S. Cl. .................... 358/1.16; 358/1.15; 235/375; 235/462.15
(58) Field of Classification Search ............ 235/462.15, 235/375; 358/1.15, 1.16
See application file for complete search history.

(56) References Cited

U.S. PATENT DOCUMENTS

| 5,327,115 | A | | 7/1994 | Swierczek | 340/309 |
|---|---|---|---|---|---|
| 5,417,508 | A | * | 5/1995 | Friedman | 402/19 |
| 5,459,307 | A | * | 10/1995 | Klotz, Jr. | 235/454 |
| 5,786,764 | A | | 7/1998 | Engellenner | 340/572 |
| 6,127,928 | A | | 10/2000 | Issacman et al. | 340/572.1 |
| 6,477,243 | B1 | * | 11/2002 | Choksi et al. | 379/100.06 |
| 6,533,171 | B1 | * | 3/2003 | Porter | 235/380 |
| 6,585,154 | B1 | * | 7/2003 | Ostrover et al. | 235/375 |

OTHER PUBLICATIONS

U.S. Appl. No. 09/404,734, filed Sep. 24, 1999, Richard G. Gossweiler, III et al.
U.S. Appl. No. 09/276,085, filed Sep. 25, 1999, Marc Dymetman et al.
U.S. Appl. No. 09/404,175, filed Sep. 24, 1999, Dave Snowden et al.
U.S. Appl. No. 09/404,174, filed Sep. 24, 1999, Laurence Hubert et al.
"Introducing TINI: Tiny InterNet Interface", Dallas Semiconductor Corp. 2000, www.ibutton.com/TINI/index.html.
"Welcome to the iButton Store", Dallas Semiconductor Corp. 2000, https://store.ibutton.com/cgi-bin/ncommerce3/CategoryDisplay?cgrfnb=801&cgmenbr=776.
"Blue Dot Receptor", Dallas Semiconductor Corp. 2000, www.ibutton.com/ibuttons/blue_dot.html.
"iButton Overview", Dallas Semiconductor Corp. 2000, www.ibutton.com/ibuttons/index.html.
"1-Wire Chips: How to Address your Refrigerator", Dallas Semiconductor 2000, www.ibutton.com/csp.html.
R. Want, D.M. Russell, Ubiquitous Electronic Tagging, IEEE Distributed Systems Online, Sep. 2000, vol. 1, No. 2, pages 1-6.
R. Want, K.P. Fishkin, A. Gujar, B.L. Harrison, Bridging Physical and Virtual Worlds with Electronic Tags, CHI '99, May 15-20, 1999, pp. 370-377.

\* cited by examiner

*Primary Examiner*—David K Moore
*Assistant Examiner*—Mark R Milia
(74) *Attorney, Agent, or Firm*—Jeannette Walder

(57) ABSTRACT

A programmable document includes a physical document having at least one sheet of material and information recorded thereon and a computer attached to the physical document. The computer includes an input/output device, a processor and a memory storing the recorded information in digital form and metadata pertaining to the physical document. By attaching small, inexpensive, computing devices to paper documents, various electronic information associated with the physical document can be retained, updated and modified.

1 Claim, 3 Drawing Sheets

PROGRAMMABLE PHYSICAL DOCUMENT

FIELD OF THE INVENTION

This invention relates generally to physical documents and more particularly to a physical document which is programmable.

BACKGROUND OF THE INVENTION

Despite the availability and convenience of electronic media, the promise of the "paperless" office has not yet come to pass. It is still true, for example, that almost all important documents are printed at least once during their life because paper is still the most convenient medium for reading, annotating and sharing documents. However, once the electronic document is printed almost all "meta" information (such as the version number, last date of modification, date of printing, change history, comments, authors, reviewer's ratings, etc.) is lost unless such information is explicitly printed on the document.

If a user wishes to copy a paper document, then the paper document must be photocopied, or the electronic version must be obtained and a new physical document generated. Copying a paper document generally results in a lower quality copy than would be obtained by printing a new version of the electronic document. However, no record of the copying is retained on either physical document. If a user wishes to modify a paper document, modifications can be written directly on the paper document or the electronic version can be obtained, modifications made and a new version printed out.

Written comments on a paper document cannot be processed automatically using current optical character recognition (OCR) technology. For these reasons, most users choose to retrieve the electronic document. However, this may not be possible, because the electronic copy may no longer exist. If the electronic copy exists, it may not be accessible. For example, the electronic copy may be located behind a corporate firewall or on a storage device (such as a floppy disk) that is not network accessible. If the device is network accessible, the network may be so busy that downloading the document takes a prohibitive amount of time, or the person wishing to obtain it might not have a network connection at all.

Even if the meta information is printed on the document it may be intrusive (in the case of a long change history) and it will normally not be machine readable. Various technologies have been developed for the purpose of storing meta information with a paper document. These technologies essentially are a way to place the meta information or metadata as machine readable code on the paper document and include barcodes, DataGlyphs and magnetic strips. Bar codes are well known and a large infrastructure of readers exits. However, bar code storage density is so low that storing anything more than the document identifier would be impractical. DataGlyphs are essentially high-density, two dimensional codes that can store up to 1000 bytes per square inch. However, with current printing technology, DataGlyphs are visible to the user. While DataGlyphs can store enough information to represent an entire document, the resulting size of the DataGlyph requires a large amount of the paper document be devoted to the DataGlyph, which many users may find intrusive. Magnetic strip technology has been around for many years and is relatively inexpensive. However, it too suffers from low storage density (only on the order of 100 bytes can be stored on the magnetic strip of a bank card, for example). In addition magnetic strips are relatively fragile and can be damaged by contact with other magnetic strips or magnetic material. If a document with a magnetic strip is photocopied, the information in the magnetic strip is not duplicated. Even if the meta information is machine readable it is certainly not modifiable on the physical document.

Various other solutions have been developed to overcome the limitations of printed machine readable code. For example, radio frequency (RF) tags have been associated with objects and are used, for example, for tracking of items in commerce. Copending, coassigned U.S. patent application Ser. No. 09/404,734 filed Sep. 24, 1999, "N-space Indexing of Digital Data Representations Using Physical Tags" describes a small version of an RF tag, called a "smart staple" which is attached to a paper document. The smart staple includes an electronic ID stored in the staple for interfacing with an electronic information system. Copending, coassigned U.S. patent application Ser. No. 09/276,085 filed Sep. 25, 1999, "Marking Medium Area with Encoded Identifier for Producing Action Through Network" describes a system for interacting with paper and retrieving an electronic copy of written notes (by tracking a user's pen as it moves over a paper document). Many Personal Digital Assistants and or palmtop computers enable tracking of handwritten notes, but such systems require access to bulky computing equipment or a network connection.

It would be beneficial to combine the advantages of electronic media with the convenience of paper. It would be beneficial to be able to quickly retrieve the electronic version of a document and all associated meta information in any situation where the paper document is available. It would also be beneficial to be able to store comments about a paper document and modifications to the document in such a way that they could be retrieved and processed electronically, without having to access expensive computer equipment or a network.

SUMMARY OF THE INVENTION

A programmable document, according to the invention, includes a physical document having at least one sheet of material and information recorded thereon and a computer attached to the physical document, wherein the computer includes an input/output device, a processor and a memory storing the recorded information in digital form and metadata pertaining to the physical document. By attaching small, inexpensive, computing devices (such as, for example, an iButton by Dallas Semiconductor or a smartcard) to paper documents, various electronic information associated with the physical document can be retained, updated and modified. Recording devices such as printers, copiers and facsimile machines may be modified so that when information is recorded on a piece of paper, the associated electronic information is stored in a computer which is then attached to the piece of paper at the same time that the paper document is printed. If a programmable document is copied, a reader in the copier duplicates the information in the memory of the computer, adds a notation that the document has been copied, stores the copied information in a new computer and attaches the new computer to the paper copy.

Various types of information associated with the document may be stored in the attached computer or computing device. The amount of information that may be stored is limited only by the size of the memory in the attached computer. This information may include, but is not limited to, an electronic copy of the document, comments by readers of the document, state changes and edits made since the document was printed, processing information, version information, copy information, transformation information, distribution information or index information and other miscellaneous information.

User comments may be input into the system in one of several ways. For example, handwritten notes may be scanned into an electronic information system, then downloaded into the programmable document's computer. In a pen-based system for recording handwritten notes on a piece of paper, data may be transferred from the pen to the programmable document's computer directly or through an electronic information system. Data, such as, for identifying the document to the pen-based system and in order to locate any landmarks on the paper necessary to enable tracking of the user's pen, may be stored in the programmable document's computer.

Copies of prior versions of the document can be easily retained and stored with the current version. Existing office equipment such as printers, photocopiers and faxes (and anything else that might produce hardcopies of documents) may be modified by adding a programmable document read/write device to enable the modified office equipment to attach a small computer to the document as it is being printed, read information on the programmable document's computer and write new information to the programmable document. In addition, as (or just before) the computing device is attached, the electronic information (such as an electronic copy of the document) may be automatically downloaded to the programmable document computer.

The computer or computing device may be attached to the physical document by an adhesive, by a spiral binding, by a removable adhesive, by a magnetic material or some other convenient attachment method. Attachment may be permanent or removable. By attaching small, inexpensive, computing devices to paper documents that can store the required electronic information, the advantages of electronic media are merged with the convenience of paper. The addition or attachment of a computing device can be performed automatically at the same time that the paper document is printed, copied or faxed. This means that in every case that the paper document is available, electronic information associated with that document is also be available.

The invention offers many advantages: self-contained access to digital information pertaining to the physical document with the physical document; the attached computer offers security; comments can be stored in written and electronic form; the original hard copy document remains fixed (no changes), but a record of comments and changes can be stored electronically.

DETAILED DESCRIPTION OF THE PREFERRED EMBODIMENTS

Figure 1:
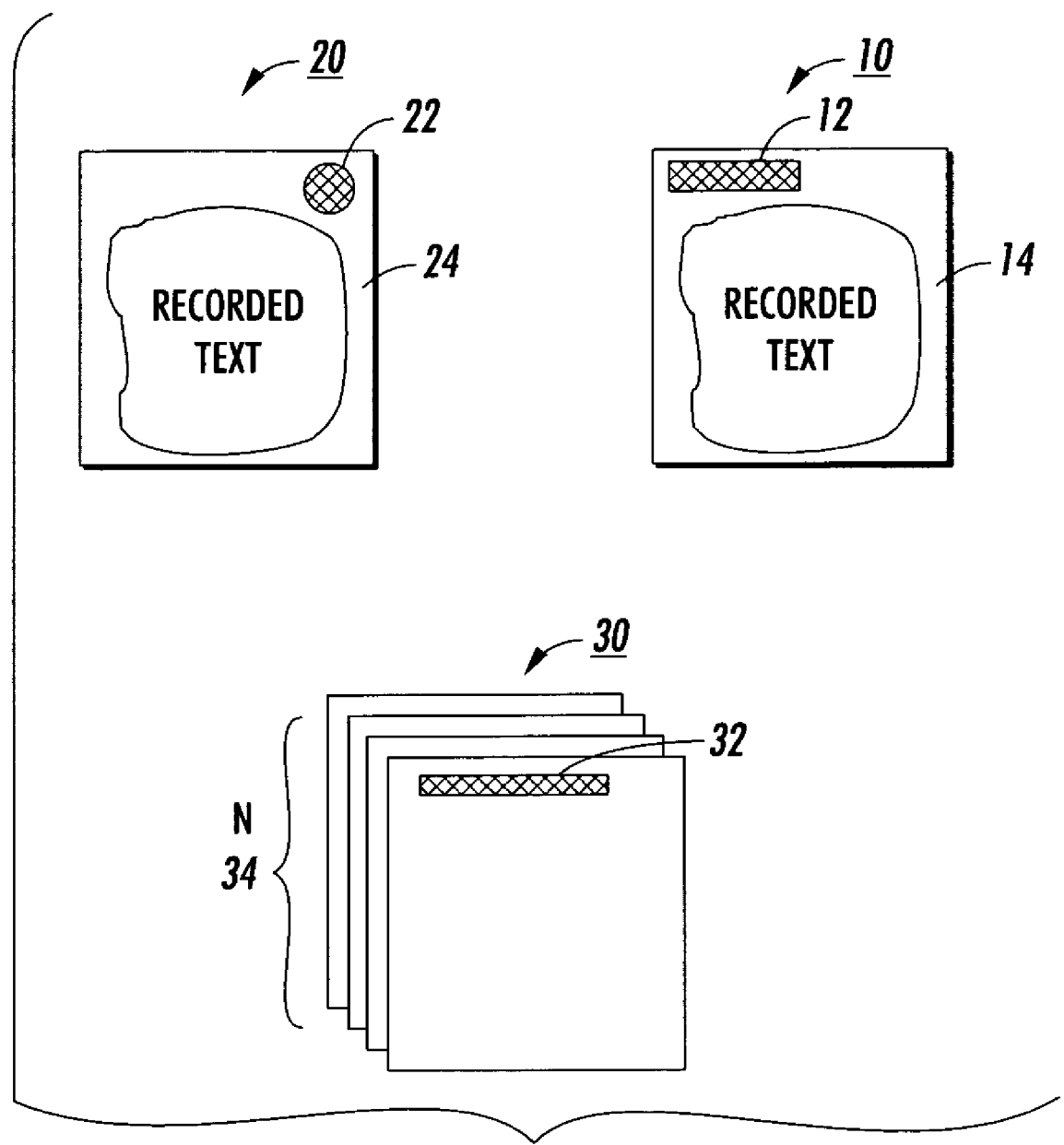
FIG. 1 is a block diagram of several embodiments of a programmable document according to the invention.

Referring to FIG. 1, three examples of programmable documents are shown and referred to by reference numerals 10, 20 and 30. Programmable documents 10 and 20 each include a sheet of material 14, 24 which includes recorded text and computer 12, 22 attached to the sheet of material. Document 30 includes multiple sheets of material (paper) 34, to which computing device 32 is attached to the cover sheet.

Computers 12, 22, 32 may be a Java iButton produced by Dallas Semiconductor. The Java iButton comes in several varieties. One variety is a small computer in a rugged steel container about the same size as a lithium battery. There are various versions of the iButton available, some of which are just memory and others which have processing and cryptographic capabilities. The Java iButton contains memory, a processor which runs a Java™ virtual machine and a battery which can maintain the internal memory for ten years. The Java iButton currently contains 64K of memory. iButtons are inexpensive and are being used in high-volume applications. Although, the current memory capacity of the Java iButton is rather limited this can be alleviated by using compression. Also the amount of memory available can be expected to rise dramatically as demand increases.

By touching the iButton to a receptor plate, information can be transferred to any other device with a RS232 serial interface at a rate of 128 Kbits per second. Dallas Semiconductor produces and sells a Blue Dot receptor which provides a means to pipeline stored data into a personal computer for iButton to PC communication. The receptor's cable connects to either a serial or parallel port.

Other inexpensive, small computing devices include smart cards in which the computing component has a very small form factor. For large bulky documents, a PCMCIA card with flash memory may be used. Alternatively, for smaller documents, a small, thin profile computing device could be built, for example, by taking miniature input/output, processor and memory components, laying them on a strip and encasing the strip in a durable plastic. Alternatively, the components could be placed on the paper document and a strip of clear adhesive placed over them, attaching them to the paper document. Another method of attaching a computing device to a paper document includes placing the thin profile input/output, processor and memory components and sandwiching them between two sheets of paper. Metal staples may be used to attach the connecting wires to the input/output components and provide an electrical contact with the read/write device.

Computing devices 12, 22 and 32 are generally attached to the paper document with an adhesive. The adhesive may be permanent or enable removal of the computing device. Other methods of attachment may also be employed, such as a reinforced hole with a paper clip or string to hold the computing device. For documents with multiple pages, a spiral binding may hold the pages together as well as providing a means to attach the computing device. A tag or label with machine readable code may be attached to the computing device 12, 22, 32 to facilitate identification by a system device.

Figure 2:
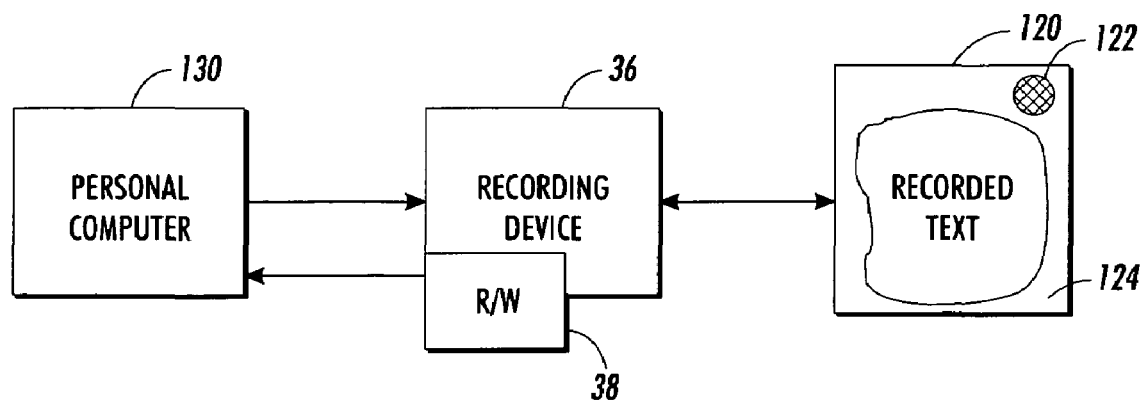
FIGS. 2 and 3 are block diagrams of a system for creating, reading and modifying programmable documents.
Figure 4:
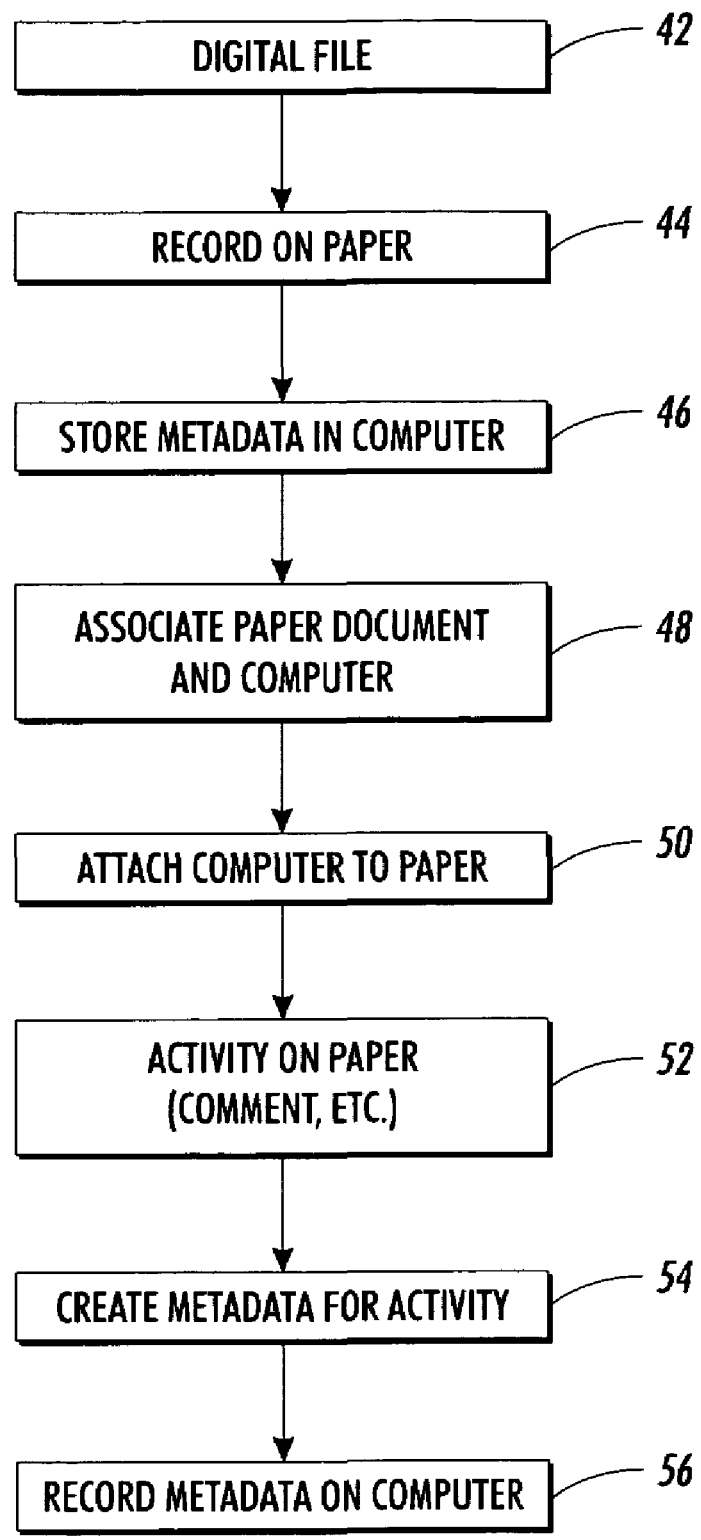
FIG. 4 is a flow chart of a method of creating and modifying a programmable document.

A programmable document is generally created from a digital file (step 42 in FIG. 4). The digital file may be stored in an electronic information system or a personal computer 130 (FIG. 2). In the case where a programmable document is created by making a copy of another programmable document, the digital file comes from the scanned image of the recorded text on the original programmable document. A digital file is sent to recording device 36 where it is recorded on a sheet of material such as paper 124 (step 44). Recording device 36 includes a read/write device 38 which stores data in programmable document computers and reads data from programmable document computers.

Read/write device 38 stores metadata (such as, a copy of the digital file, author, date of recording, etc.) in a computing device such as an iButton 122 (step 46). Read/write device 38 associates the paper document 124 with the iButton 122 (step 48) and sends a notice of this to personal computer 130. Then the iButton 122 is attached to the paper 124 (step 50) and programmable document 120 is created.

Figure 3:
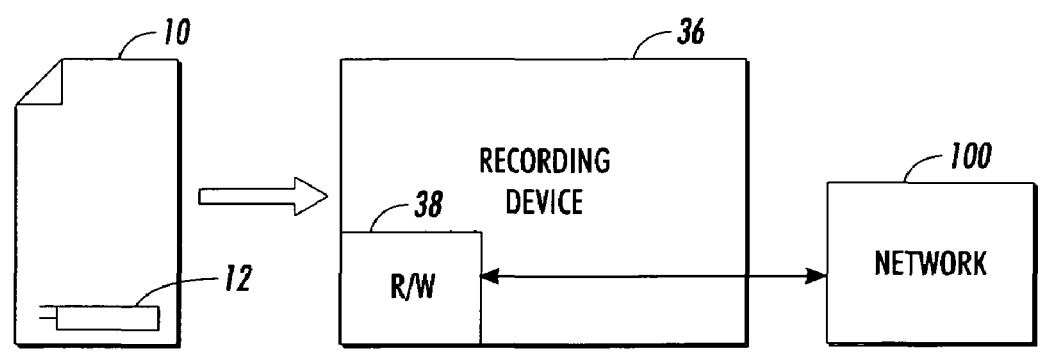

If the memory in iButton 122 is not sufficient to store the digital file, a URL of the location of the associated digital file in an electronic information system may be stored instead. If a programmable document 10 is scanned by recording device 36 and its associated computing device 12 is read by reader 38, the reader can use the URL to obtain the digital file from network 100 (FIG. 3). If the URL is an internet address, then the reader must be connected to the Internet either directly or through network 100.

Storing a URL for the digital version of a document (indeed, metadata for the document may be stored at the same URL or another URL) enables the programmable document to be used with an electronic information system which employs pens or pointers as input devices. The URL identifies the programmable document to the pen or pointer of the electronic information system and uses it to deduce the current pointer position on the printed document. In prior systems, such information would be printed in machine readable code, such as a DataGlyph, on the paper. By storing the information in the computing device, this removes the need to print potentially intrusive DataGlyphs on the document itself.

Storing the URLs of the actions associated with document and their corresponding positions on the printed document enables users to select parts of the document and trigger the associated action. Applets (small computer programs) which implement certain defined actions could be stored in the computing device and obviate the need for a network connection to access the applet online.

Although the computing devices cannot themselves be photocopied or faxed, fax machines and photocopiers may be equipped with reading devices and copy the data at the same time that the paper document is copied. The technology required to implement the scenario above already exists and is readily available.

Referring to FIG. 3, suppose a user wrote a comment on programmable document 10. This activity can be recorded in the computing device 12 (step 52) by scanning the document 10 with comments in recording device 36. Computing device 12 is read by read/write device 38, which creates metadata (step 54) indicating a comment was written on the document (and perhaps the date of scanning or inputting). This metadata, and possibly (subject to memory constraints on the computing device 12) and image of the written comments is stored in computing device 12 (step 56). Alternatively, the read/write device may store the image of the comments with the metadata in network 100 and store the URL for the metadata and comments in computing device 12.

The invention can be advantageously used in the decentralized network system called Pollen as described in copending, coassigned, U.S. patent application Ser. No. 09/404,175, filed Sep. 24, 1999, "Decentralized Network System" Snowdon et al. One advantage of digital documents is that they can be easily transferred between people using networks. However, there are cases in which it might be useful to transfer information but a traditional network is unavailable. Pollen, as described in the '175 application networks devices and physical spaces using people instead of wires. Examples of devices include printers, fax machines and PicTels. Examples of physical locations include meeting rooms, offices, and reception desks. This large variety of devices and locations is typically very expensive to network using wires. But these nodes are already connected together—by the movement of people.

In the course of their work day, people move from device to device and from location to location, just as bees move from flower to flower in a field, in search of nectar. However, a bee also inevitably collects pollen on its body when it visits a flower and, when it moves to a different flower, some of this pollen rubs off. Pollen proposes that people carry an electronic form of pollen with them, not on their bodies, but inside their Personal Digital Assistants (PDAs such as PalmPilots, Psions, etc. that are rapidly becoming ubiquitous). In turn, devices and spaces can be made "pollen-ready" by affixing suitably programmed computers. In one embodiment of the '175 application iButtons are attached to printers, facsimile machines, rooms, etc. When a user visits a device or room, its iButton and the user's PDA exchange messages. Similarly, when a user docks his/her PDA with a workstation connected to a traditionally networked electronic information system, his/her PDA exchanges messages with a central organizational repository (the hive) via either a traditional network connection such as a LAN or WAN or even the Internet. By a sequence of such exchanges, messages can be passed from one arbitrary node in the network to another. The message can be passed between two arbitrary nodes in any of several ways. One user can carry it directly from one node to another. It can pass through intermediate nodes, carried from node to node by a number of different users. It can pass through the hive on its way to another node: one user deposits the message at the hive when docking and a second user picks up it later when docking.

A programmable document which is a paper document with an associated/attached computing device, such as an iButton, could participate in a Pollen network. Users without PDAs could use programmable documents to collect information. The Pollen network would transparently allow comments associated with a paper document to be shared with other people. Another benefit is that paper documents could themselves become "pollen carriers" and used to transfer relevant (but not directly related information) along with the document. This information would then be transparently extracted whenever another Pollen-enabled device (for example a PDA such as a Palm Pilot) was "docked" with the computing device attached to the paper document.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A programmable document, comprising:
a physical document including at least one sheet of material and information recorded thereon; and
a computer attached to the physical document, wherein the computer includes
an input/output device,
a memory storing the recorded information in digital form, any updates and modifications to the recorded information, all metadata pertaining to the physical document, wherein the metadata comprises at least one of processing information, version information, user comments, copy information, transformation information, distribution information and index information,
a processor for updating and modifying the recorded information in digital form and the metadata pertaining to the physical document, and
a computer program, stored in the memory, for implementing defined actions, operable by the processor, wherein the recorded information in digital form and all metadata pertaining to the physical document is available where the physical document is available;

wherein the metadata comprises at least one of an electronic copy of the information recorded on the physical document, comments by readers of the document, state changes and edits made since the document was printed, processing information, version information, copy information, transformation information, distribution information, index information and other miscellaneous information;

wherein the metadata comprises text, or portions thereof, of the information recorded on the document which has been translated into another language.

* * * * *